US 6,694,253 B2
United States Patent
Schroeder
(10) Patent No.: US 6,694,253 B2
(45) Date of Patent: Feb. 17, 2004

(54) NAVIGATION DEVICE FOR RECEIVING SATELLITE BROADCAST DISTRIBUTION OF MAP DATA

(75) Inventor: Daryl D. Schroeder, Florissant, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 177 days.

(21) Appl. No.: 09/972,005

(22) Filed: Oct. 9, 2001

(65) Prior Publication Data
US 2003/0069691 A1 Apr. 10, 2003

(51) Int. Cl.[7] .............................................. G01C 21/32
(52) U.S. Cl. ...................... 701/208; 701/200; 701/213; 340/995.18
(58) Field of Search ................................. 701/200, 202, 701/208, 211, 213; 340/988, 990, 995.18; 342/357.01, 357.08, 357.12

(56) References Cited

U.S. PATENT DOCUMENTS

| 5,528,518 A | 6/1996 | Bradshaw et al. ........... 364/561 |
| 5,670,902 A | 9/1997 | Nakagawa et al. ........... 327/99 |
| 5,761,385 A | 6/1998 | Quinn .......................... 395/22 |
| 5,790,175 A | 8/1998 | Sklar et al. ..................... 348/8 |
| 5,838,668 A | 11/1998 | Okada et al. ................. 370/312 |
| 5,898,680 A * | 4/1999 | Johnstone et al. ........... 370/316 |
| 5,987,381 A | 11/1999 | Oshizawa .................... 701/209 |
| 6,012,159 A | 1/2000 | Fischer et al. ............... 714/755 |
| 6,021,371 A * | 2/2000 | Fultz ............................ 701/200 |
| 6,040,798 A * | 3/2000 | Kinal et al. ............. 342/357.01 |
| 6,108,365 A | 8/2000 | Rubin et al. ................. 375/130 |
| 6,169,955 B1 * | 1/2001 | Fultz ............................ 701/200 |
| 6,172,972 B1 | 1/2001 | Birdwell et al. ............. 370/349 |
| 6,179,329 B1 | 1/2001 | Bradley ..................... 280/801.1 |
| 6,199,015 B1 | 3/2001 | Curtwright et al. .......... 701/213 |
| 6,222,482 B1 | 4/2001 | Gueziec .................. 342/357.08 |
| 6,249,245 B1 | 6/2001 | Watters et al. .......... 342/357.03 |
| 6,271,798 B1 | 8/2001 | Endo et al. ................... 343/713 |
| 6,272,349 B1 | 8/2001 | McGrath et al. ............. 455/456 |
| 6,272,430 B1 | 8/2001 | Krasner ....................... 701/207 |
| 6,272,679 B1 | 8/2001 | Norin .......................... 725/62 |
| 6,275,185 B1 | 8/2001 | Loomis .................. 342/357.14 |
| 6,282,490 B1 | 8/2001 | Nimura et al. ............... 701/208 |
| 6,336,073 B1 * | 1/2002 | Ihara et al. .................. 701/202 |
| 2002/0067288 A1 * | 6/2002 | Wakamatsu et al. ......... 340/901 |
| 2003/0033083 A1 * | 2/2003 | Nakashima et al. ......... 701/211 |

* cited by examiner

Primary Examiner—Gary Chin

(57) ABSTRACT

A navigation device having a satellite broadcast receiver for receiving a broadcast transmission of map data for use in the navigation device. The navigation device also includes a location determining device such as a global positioning system receiver to determine a geographic location of the navigation device. The location of the device is compared with the received map data, and if there is a match, the map data is stored in a computer storage medium and displayed on a screen.

16 Claims, 4 Drawing Sheets

NAVIGATION DEVICE FOR RECEIVING SATELLITE BROADCAST DISTRIBUTION OF MAP DATA

TECHNICAL FIELD

The technical field relates generally to the field of navigation systems, and more particularly to a navigation device for receiving satellite broadcast distribution of map data and related methods.

BACKGROUND

Navigation systems that display map images corresponding with a geographic location are widely available. In a typical navigation system, a processor is connected with a memory system having data corresponding to a geographic map image, such as a geographic information systems (GIS) database. Oftentimes, the geographic map images are stored as raster graphic data, bit map data, or vector graphic data. In many navigation systems, the memory system is a compact disk-read only memory (CD-ROM), and the map images are stored on compact disks (CDs).

Navigation systems are installed in automobiles as a factory option or as an aftermarket addition, and have become a popular feature with rental car companies. In many examples, the navigation system is connected with a position sensing device, such as a global positioning system (GPS) receiver, and the correct geographic map for the vehicles location is automatically displayed in correspondence with the GPS determined location of the vehicle.

One drawback of current navigation systems is the difficulty in which map images are distributed to users of the systems. In the case of CD-ROM based map images, new CDs must be mailed to the users of the system, and the users have to manually manage their inventory of CD-based map images. Another drawback of current navigation systems, is that when the user drives out of a range of the map images on the CD currently loaded in the CD-ROM drive, the user must manually find and insert a CD for the new location.

SUMMARY

It was recognized by the present inventor that it would be advantageous to remove the expense, hassle, and difficulties associated with updating and maintaining a CD-based map inventory for navigation devices. In response to this recognition, the present inventor conceived of a method and an apparatus for distributing map data using satellite broadcast transmission. A satellite orbiting the earth broadcasts map data, which is updated and transmitted to the satellite from a ground station in communication with the satellite. The navigation device is especially adapted to receive broadcast communication from the satellite. After receiving a broadcast map, the navigation device determines if the map corresponds with the location of the vehicle. To determine location, the navigation device includes a location detection device such as a GPS receiver. If the map corresponds with the location of the navigation device, then the map is loaded in memory and displayed on a screen connected with the navigation device.

A navigation device according to an aspect of the present invention includes a central processing unit, or other processor, in communication with a computer storage medium, such as the various types of random access memory, read-only memory, optical disk storage technology such as compact disk-read only memory, hard disk drive devices, compact disk recordable, memory stick, and the like. The navigation device further includes a satellite broadcast receiver in communication with the central processing unit and with the computer storage medium. The satellite broadcast receiver receives broadcast map data from a satellite. The map data is stored in the computer storage medium, after which map images corresponding with the map data are presented on a display connected with the navigation device. The navigation device may further include a global positioning system receiver in communication with the central processing unit. The global positioning system receiver is used for determining a geographic location of the navigation device.

A method of providing map data to a navigation device according to an aspect of the present invention includes a first operation of receiving a broadcast transmission of map data corresponding with a first geographic location. In a second operation, determining a second geographic location corresponding with the geographic location of the navigation device. In a third operation, comparing the first geographic location to the second geographic location. The geographic location data may include latitude and longitude data. The comparing operation includes determining if the map data includes a map image for the geographic location of the navigation device. In a fifth operation, in response to the comparing operation, storing the map data in a computer storage medium. The operation of determining a second geographic location includes receiving a global positioning satellite signal, which is used by the global positioning system receiver to determine the location of the navigation device.

The method may further include the operation of displaying a map image corresponding with the map data. The map data can be in a bit-map format, a vector graphic format, a raster graphic format, in a geographic information system format, or the like. The method may further include the operation of determining a direction of travel of the navigation device, and in a second comparing operations, comparing the first geographic location with the direction of travel of the navigation device and in response to the second comparing operation, storing the map data in the computer storage medium.

DESCRIPTION OF THE DRAWINGS

The detailed description will refer to the following drawings, wherein like numerals refer to like elements, and wherein.

DETAILED DESCRIPTION

The invention will now be described in detail with reference to various embodiments thereof, with some aspects of the invention being described in the accompanying drawings. Numerous specific details are set forth in order to provide a thorough understanding of the present invention. However, it will be apparent to those skilled in the art that the present invention may be practiced without some or all of the specific details, that operations may be rearranged, that some operations may be eliminated or performed in a different way, and that other changes may be made without departing from the spirit and scope of the present invention.

Figure 1:
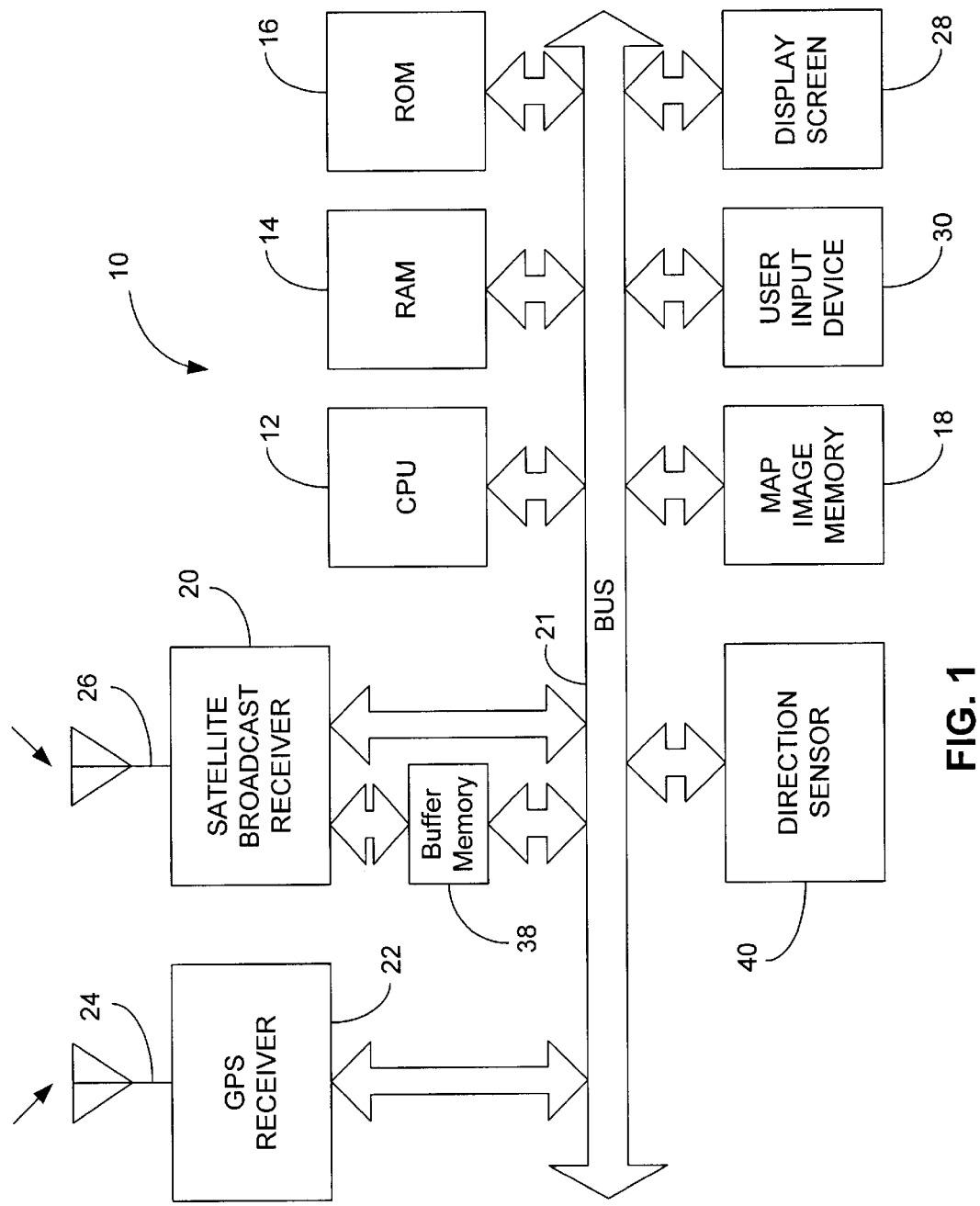
FIG. 1 is a block diagram of a navigation device according to one embodiment of the present invention.

FIG. 1 illustrates one embodiment of a navigation device 10. A central processing unit (CPU) 12, is coupled with a random access memory (RAM) 14, a read only memory (ROM) 16, and a map memory 18. In one example, the CPU, RAM, ROM, and map memory are each coupled with a bus 21 for communication therebetween. As will be understood by those skilled in the art, the novel functionality of the navigation device 10 as described herein is carried out in response to the CPU 12 executing instructions stored in the RAM 14, the ROM 16, some combination thereof, or other computer storage medium. In one example, operations according to the present invention are permanently stored in the ROM 16 or other non-volatile memory, such as a CD-ROM, a digital versatile disk (DVD), a hard drive, and the like, and are loaded in the RAM 14 or other high-speed memory for execution by the CPU 12.

The map memory 18 includes any recordable or writable computer storage medium, such as RAM, compact disk recordable (CD-R), hard disk drives, and the like. In addition, the map memory 18 may be combined with other computer storage mediums connected with the navigation device, such as the RAM 14. Data stored in the map memory 18 for access by the CPU 12 includes bit-mapped map image data, vector graphic map image data, geographic information system (GIS) data, rastor graphic map image data, and other forms of storing or compressing digitized map images, collectively referred to as "map data." In one example, the map data includes street maps useful in vehicle navigation. As will be discussed in more detail below, the map data is loaded in the map memory 18 from a satellite broadcast receiver 20 as a function of the geographic location of the navigation device as determined by a GPS receiver 22.

The GPS receiver 22 is for receiving global positioning system information, and is in communication with the CPU 12. The global positioning system information received by the GPS receiver 22 is used to determine the location of the navigation device, as is known in the art. As illustrated in FIG. 1, in one example, the GPS receiver 22 is coupled with the bus 21 to transmit and receive data and commands from the various components coupled with the bus 21. Alternatively, the GPS receiver 22 may be replaced with any device capable of determining the location of the navigation device 10. An antennae 24 connected with the GPS receiver 22 receives GPS signals from a constellation of GPS satellites (shown in FIG. 2). Suitable GPS receivers for use in the present invention are well known in the art, with one example being the GPS receiver described in U.S. Pat. No. 6,272,349 entitled "Integrated Global Positioning Receiver," issued Aug. 7, 2001, which is hereby incorporated by reference in its entirety. Another suitable GPS receiver is described in U.S. Pat. No. 6,272,430 entitled "GPS Receiver and Method for Processing GPS Signals," issued on Aug. 7, 2001, which is hereby incorporated by reference in its entirety.

A display screen 28 is also in communication with the CPU 12. In one embodiment, the display screen 28 is connected with the bus 21. The display screen displays the map images corresponding with the map data stored in the map memory 18. In addition, the display screen shows navigation commands, such as "zoom," generally found in typical navigation devices. The commands may be executed in response to input from a user input device 30 connected with the CPU 12. User input devices include a keyboard, a mouse, a touchscreen, a stylus, voice command, and other input means generally known in the art.

The satellite broadcast receiver 20 is in communication with the CPU 12 and other components of the navigation device 10. In one example, the broadcast receiver 20 is coupled with the bus 21 to transmit and receive data and commands from the other components connected with the bus. A buffer memory 38 may also be coupled with the satellite broadcast receiver for temporarily storing map data. An antennae 26 connected with the broadcast receiver 20 receives the broadcast signal from the satellite 36.

In one embodiment, a direction sensor 40 is coupled with the bus 21 and thereby in communication with the CPU 12 and other components of the navigation device 10. The direction sensor determines the travel heading of the navigation device. One example of the direction sensor 40 is a compass, which can determine the orientation of the navigation device 10 or vehicle carrying the navigation device 10 and hence its direction of travel.

Figure 2:
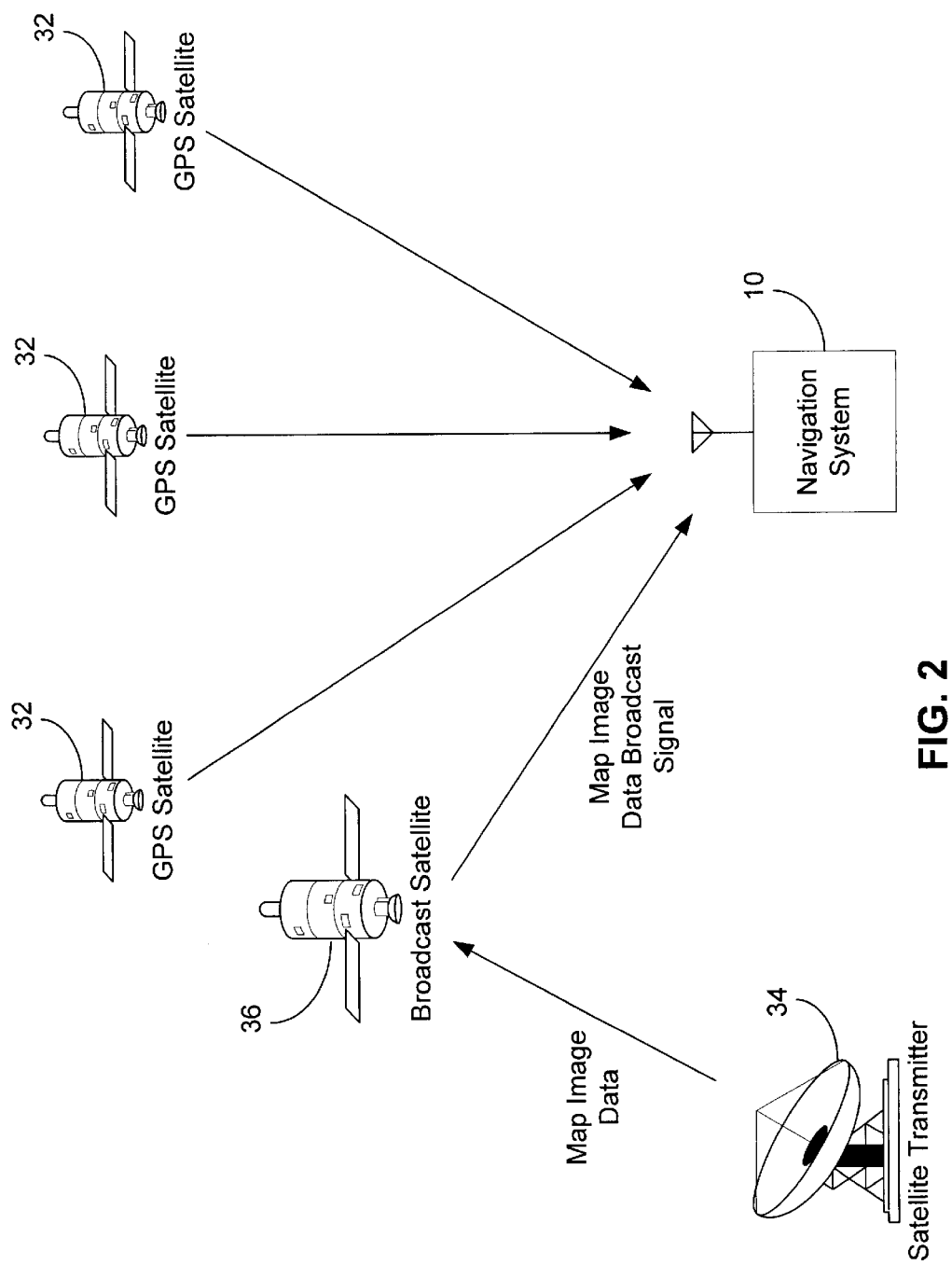
FIG. 2 is a system diagram according to the embodiment of FIG. 1.

FIG. 2 illustrates a system for satellite distribution of map data to the navigation device according to one embodiment of the present invention. The GPS satellite constellation includes one or more GPS satellites 32, as is well known in the art. The GPS receiver 22 determines the position of the navigation device 10 by computing the relative time of arrival of signals from the GPS satellites 32. Typically, three GPS satellite signals are required for the GPS receiver 22 to determine the latitude, longitude, and altitude of the GPS receiver 22. Location accuracy of closer than 100 meters is achievable, and with correlation to signals from one or more ground stations (not shown), location accuracy of about three meters is achievable.

The system includes a ground-based satellite transmitter 34 for transmitting map data to one or more satellites 36. The satellite 36 broadcasts the map data which is received by the broadcast receiver 20 of the navigation device 10. In embodiments of the present invention, the satellite 36 includes a broadcast satellite, a communication satellite, or other orbiting device capable of broadcasting the map data. The map data is transmitted to the navigation device by satellite broadcast signal, ultra high frequency (UHF), very high frequency (VHF) or other transmission signals known in the art. In one example, only map data corresponding to the geographic locations in the satellite's broadcast range capability is transmitted.

Figure 3:
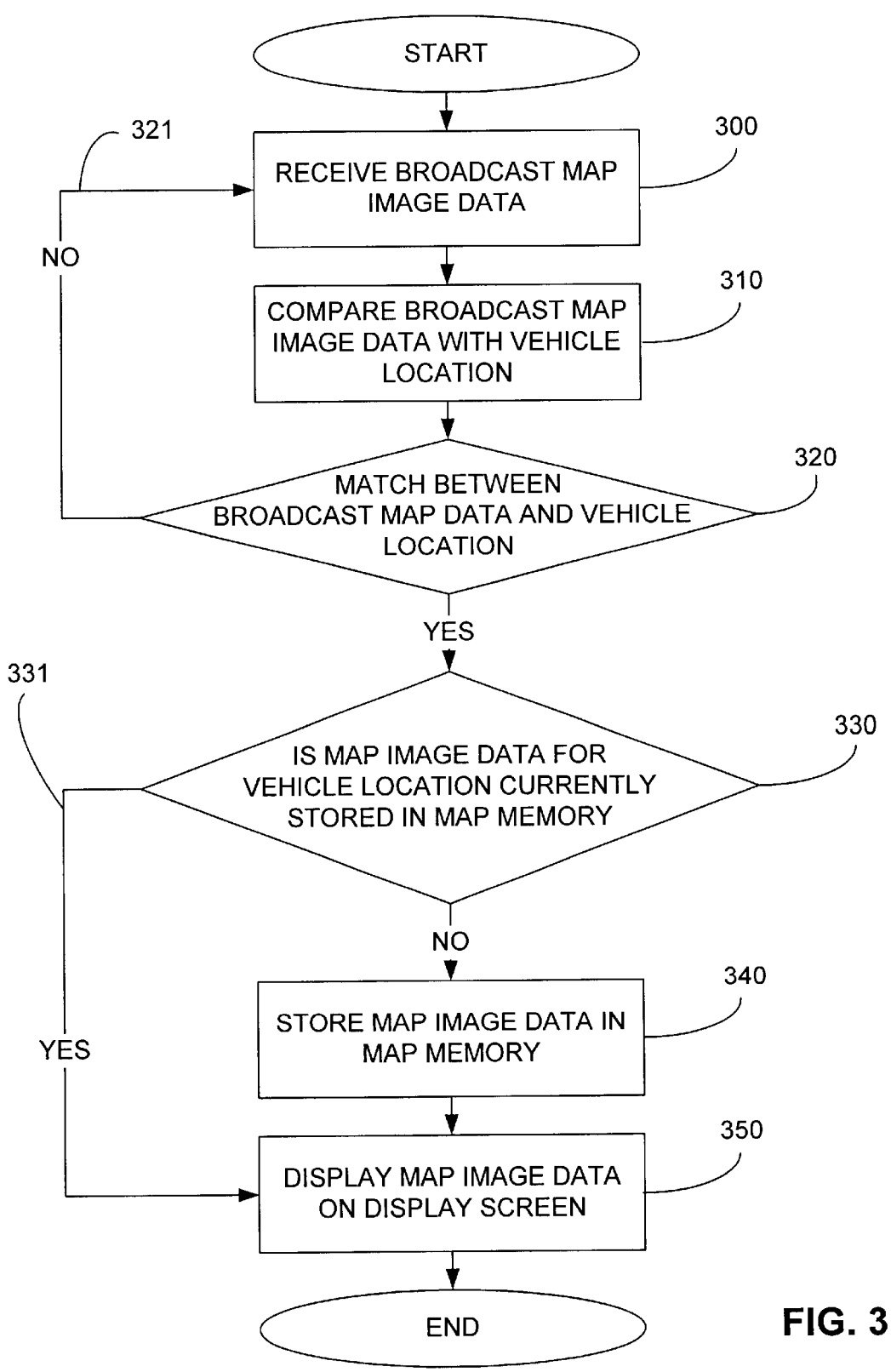
FIG. 3 is a flowchart illustrating a first method according to the embodiment of FIG. 1.

FIG. 3 is a flowchart illustrating one method according to the present invention. The broadcast receiver 20 receives a broadcast map data packet from the satellite 32 (operation 300). The broadcast map data packet includes a packet header having a destination address formatted to correlate with the latitude and longitude of the broadcast map data. In one example, the geographic center of the map image associated with the map data is provided in the destination address. The packet also includes a payload section for transmission of all or a portion of the map data. Depending on the resolution of the map data, the format of the map data, and other factors, one or more data packets may be required to complete a map image corresponding with the latitude and longitude of the navigation device 10. In this case, information stored in the data packet, such as in trailing bits, is used to correlate the several data packets, and to display a complete map image.

The destination address in the packet header is compared with the navigation device location as determined by the GPS receiver 22 (operation 310). In one example, the GPS receiver 22 or CPU 12 translates the latitude and longitude into a unique location bit pattern. The broadcast receiver 20 parses the incoming packet header to extract the destination address, and to determine the latitude and longitude for the received map data, which is also in the form of a unique map bit pattern. The location bit pattern and the map bit pattern are compared (operation 320), and if there is a match, either exact or within a margin, then operation 330 is performed. If there is no match, the next broadcast map data is received (operation 321).

If there is a match, it is determined whether map data corresponding with the destination address is currently stored in the map memory 18 (operation 330). Alternatively, in some embodiments, the map data corresponding to the location of the vehicle automatically overwrites any existing map data in the map memory 18.

If map data corresponding with the destination address is not already stored in the map memory 18, then the received broadcast map data packet is stored in the map memory device 18 (operation 340). In one example of the present invention, the high speed buffer memory 38 is connected to the broadcast receiver 20 so that data packets may be temporarily stored while matching and comparison operations are performed. The map image corresponding with the map data is displayed on the display screen 28 (operation 350). If map data is stored in the map memory 18, then the map data is displayed on the display screen 28 (operation 331).

In one example, multiple broadcast bands are used to transmit map data in parallel. The map data packets are arranged in a row and column format, with each map data packet occupying a particular row and column. As with the above described example, the map data packets may include a destination address. Alternatively, a key to the table may be transmitted separately to the broadcast receiver 20 and stored in the memory 14. The key identifies the relationship between map images for particular geographic locations and particular data packets whether transmitted serially or in parallel in the broadcast bands. In yet another alternative, the broadcast stream of data packets may be transmitted from the satellite in a consistent pattern, and the navigation device preprogrammed with the location of the data packets corresponding with particular geographic locations in the broadcast pattern. In addition, as is known in the art, for any of the broadcast alternatives the broadcast signals may be encrypted so that only authorized navigation devices 10 programmed to decrypt the broadcast signal may receive map data.

Figure 4:
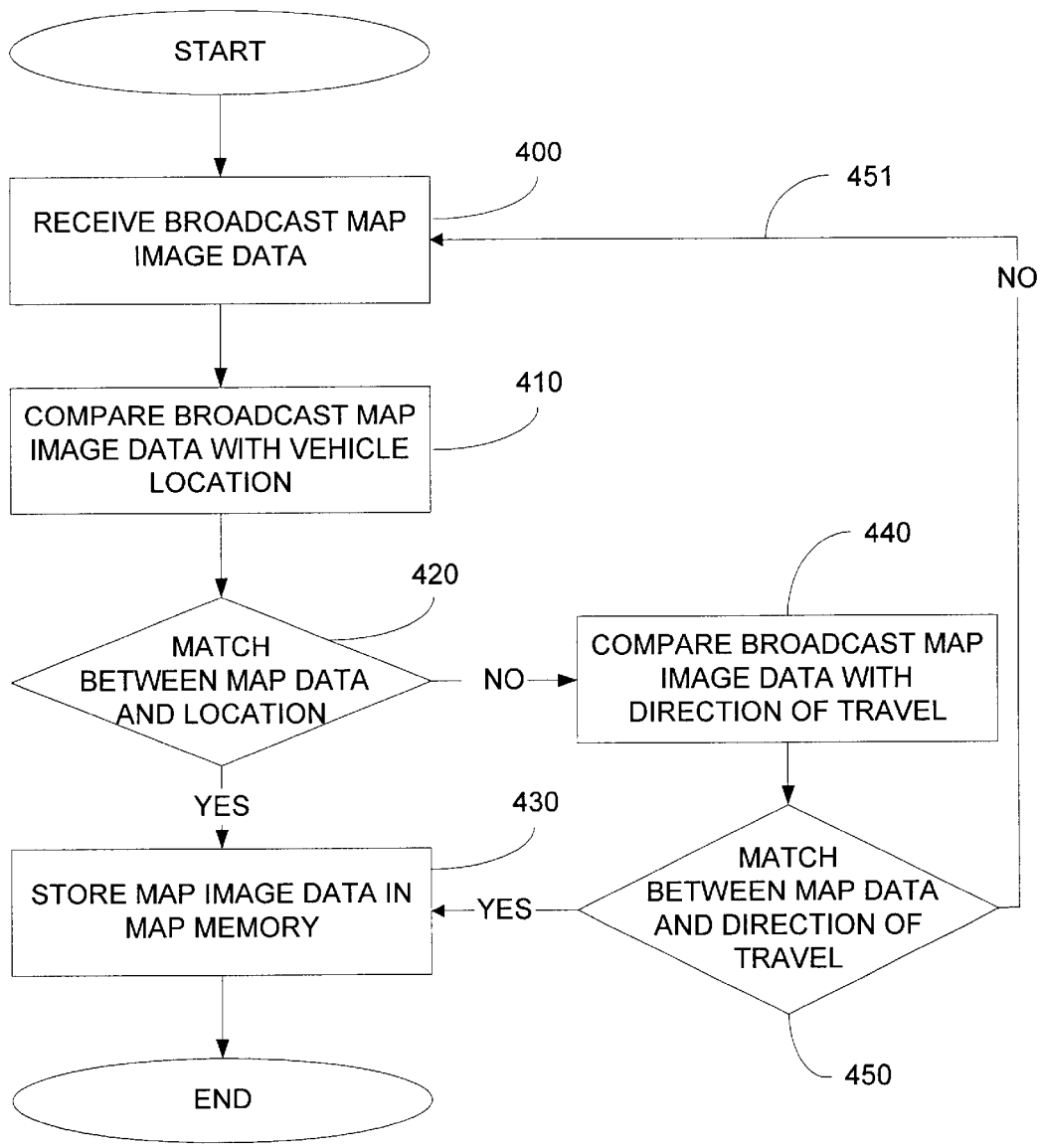
FIG. 4 is a flowchart illustrating a second method according to the embodiment of FIG. 1.

In some embodiments, map data corresponding to a plurality of map images is downloaded and stored in the map memory 18. FIG. 4 is a flowchart illustrating another method where map data corresponding with the direction of travel of a vehicle carrying the navigation device is downloaded from the satellite and stored in the map memory.

The broadcast receiver 20 receives map data from the broadcasting satellite 36 (operation 400). The received map data is compared with the location of the navigation device 10 as determined by the GPS receiver 22 (operation 410). If there is a match between the map data and the location of the navigation device (operation 420), then, in operation 430, the map data is stored in the map memory 18. In any of the embodiments described herein, the map data corresponds with a range of geographic locations. Conceptually, the map data corresponds with a map image larger than the display screen 28, which facilitates smooth image transformation on the display screen 28, as the vehicle carrying the navigation device 10 moves.

If there is no match, then, in operation 440, the received map data is compared with the direction of travel. In one example, the direction of travel is determined by the direction sensor 40.

In operation 450, if the received broadcast map data corresponds with the next map image for the direction of travel of the vehicle, then in operation 430 the map data is stored in the memory. By prefetching the map data corresponding to the direction of travel, the next likely map data is already present in the map memory 18. Prefetching map data is readily expandable, bounded only by limitations of map memory capacity. Accordingly, map data corresponding with map images from some or all geographic locations surrounding the location of the navigation device may be downloaded, which facilitates seamless map image display as the navigation device physically moves across map boundaries or the driver unpredictably changes direction. If the received broadcast map data does not correspond with the next map image for the direction of travel, then the device waits for the next broadcast transmission (operation 451).

The present invention is equally useable with bit-map data map images, rastor graphic map images, vector graphic data, and the like, but with resultant performance and resolution tradeoffs. For example, rastor graphic data tends to provide more detailed maps compared with bit-map data, but requires more data to display a map for the same geographic area. Attendant with a larger data size is a requirement for a larger memory storage, or for a lesser number of maps to be stored. In addition, rastor graphic data likely will require division across multiple packets for broadcast transmission, which results in a slower download of map data. Vector graphic data is less memory intensive and requires less bandwidth for transmission as compared with either rastor graphic data or bit-map data, but generally has less resolution and requires more CPU processing to generate and display the map associated with the vector graphic data.

The broadcast receiver 20 may also receive local frequency modulation broadcast data of road closure information, traffic information and the like. The navigation system is then configured to highlight portions of the map data corresponding with the received local broadcast information. For example, if a particular road is closed, the road on the map image will be highlighted in red. This features is particularly useful for drivers of emergency response vehicles to properly plan a route to whatever location they may be driving to.

As will be recognized by those skilled in the art from the foregoing description of example embodiments of the invention, numerous variations to these embodiments made be made without departing from the scope of the invention as defined by the following claims. Accordingly, we claim all such changes that come within the scope of the claims.

What is claimed is:

1. A navigation device comprising:
 a central processing unit;
 a computer storage medium in communication with the central processing unit;
 a satellite broadcast receiver in communication with the central processing unit and with the computer storage medium, wherein the receiver receives broadcast map data; and
 a direction sensor, in communication with the central processing unit, that determines a travel heading of the navigation device, wherein the broadcast map data is stored in the computer storage medium as a function of the travel heading of the navigation device.

2. The navigation device of claim 1 further comprising a global positioning system receiver in communication with the central processing unit, wherein the global positioning system receiver determines a location of the navigation device.

3. The navigation device of claim 2 wherein the broadcast map data is stored in the computer storage medium as a function of the location of the navigation device.

4. The navigation device of claim 2 further comprising a display in communication with the central processing unit, wherein the display displays a map image corresponding with the broadcast map data.

5. The navigation device of claim 4 further comprising a vehicle coupled with the navigation device, wherein the central processing unit is operable to present the map image on the display corresponding with the location of the vehicle.

6. The navigation device of claim 1 further comprising a buffer memory connected with the satellite broadcast receiver, wherein the buffer memory temporarily stores the broadcast map data.

7. A method of providing map data to a navigation device comprising:

receiving a broadcast transmission including map data corresponding with a first geographic location;

determining a direction of travel for the navigation device;

comparing the first geographic location with the direction of travel of the navigation device; and if the first geographic location matches the direction of travel, storing the map data in a computer storage medium as a function of the direction of travel of the navigation device.

8. The method of claim 7 further comprising:

determining a second geographic location corresponding with the first geographic location of the navigation device;

comparing the first geographic location to the second geographic location; and if the first geographic location matches the second geographic location, storing the map data in the computer storage medium.

9. The method of claim 8 wherein the operation of determining a second geographic location includes receiving a global positioning satellite signal.

10. The method of claim 9 further including the operation of displaying a map image corresponding with the map data.

11. The method of claim 7 wherein the map data is in a bit-map format.

12. The method of claim 7 wherein the map data is in vector graphic format.

13. The method of claim 7 wherein the map data is in a rastor graphic format.

14. The method of claim 7 wherein the map data is in a geographic information system format.

15. The method of claim 8 wherein the first geographical location includes a first latitude component and a first longitude component, and the second geographic location includes a second latitude component and a second longitude component.

16. A navigation device comprising:

means for receiving a satellite broadcast transmission of map data;

means for receiving a global positioning satellite transmission to determine a location of the navigation device;

means for determining a direction of travel for the navigation device;

means for storing the map data as a function of the direction of travel of the navigation device; and means for displaying the map data.

* * * * *